Figure 1:
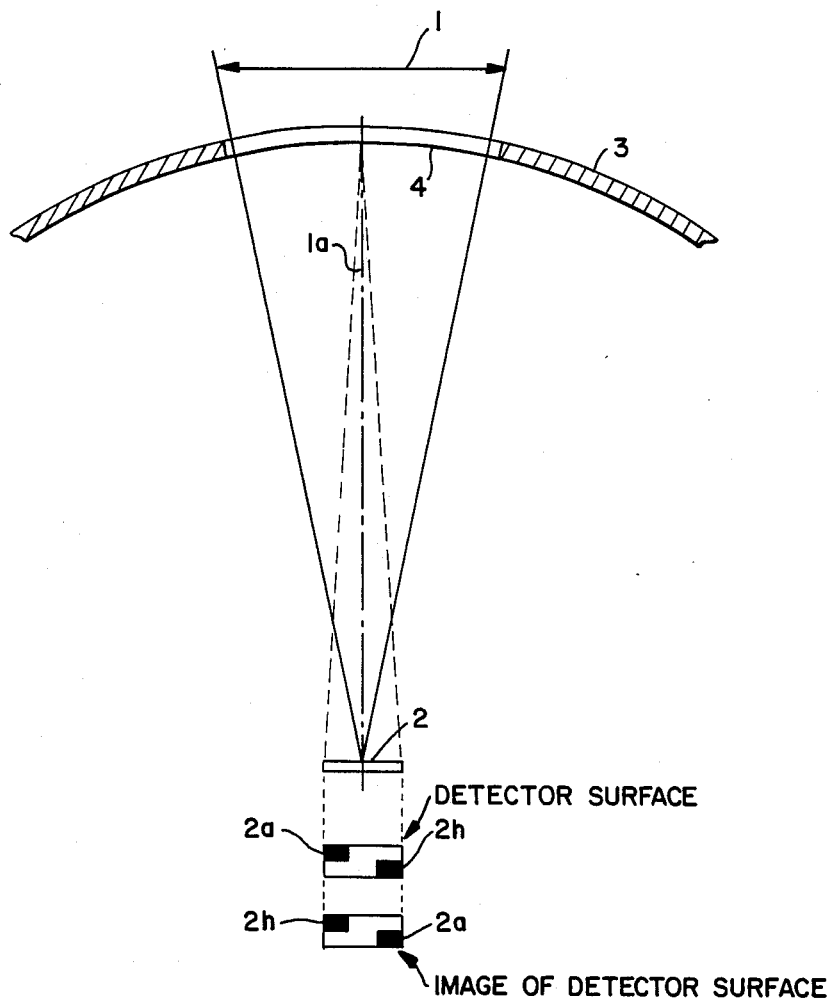

United States Patent [19]

Menke

[11] Patent Number: 4,855,600

[45] Date of Patent: Aug. 8, 1989

[54] THERMAL IMAGING DEVICE IN COMBINATION WITH AN IMAGE PRODUCTION SYSTEM

[76] Inventor: Josef F. Menke, Foerdestrasse 27, D-2392 Gluecksburg, Fed. Rep. of Germany

[21] Appl. No.: 185,008

[22] Filed: Apr. 22, 1988

[30] Foreign Application Priority Data

Apr. 29, 1987 [DE] Fed. Rep. of Germany ....... 3714270

[51] Int. Cl.$^4$ ......................... H04N 5/33; H01L 31/04
[52] U.S. Cl. .................................... 250/332; 250/334; 250/352; 250/353
[58] Field of Search ............... 250/352, 332, 349, 353, 250/334, 252.1 A; 358/113

[56] References Cited

U.S. PATENT DOCUMENTS

| | | | |
|---|---|---|---|
| 3,617,745 | 11/1971 | Reed | 250/347 |
| 4,420,688 | 12/1983 | LeBars | 250/353 |
| 4,421,985 | 12/1983 | Billingsley et al. | 250/352 |
| 4,707,736 | 11/1987 | de Virel | 250/334 |

Primary Examiner—Carolyn E. Fields
Attorney, Agent, or Firm—Gilbert L. Wells

[57] ABSTRACT

An improved thermal imaging device is provided herein, which includes an internally-mirrored autocollimating mirror, a multi-element detector and a diaphragm in the mirror for limiting the aperture of the multi-element detector. In the improved device the multi-element detector is offset from the optical axis. At a symmetrical point on the other side of the optical axis, at which the autocollimating mirror forms an image of the multi-element detector, a mirror is disposed. Such mirror project the image of the multi-element detector back to the autocollimating mirror. Such image is then reflected once more right way up and laterally unreversed onto the multi-element detector in such a way that each individual detector element receives its own image.

3 Claims, 2 Drawing Sheets

THERMAL IMAGING DEVICE IN COMBINATION WITH AN IMAGE PRODUCTION SYSTEM

This invention relates to a thermal imaging device which is used in conjunction with a corresponding image reproduction system to generate, for example, a visible image based on the infrared rays impinging on the device.

The technology of such thermal imaging devices is well known. The infrared radiation emitted by point sources is focussed onto a cooled detector by means of a lens. Behind the lens is arranged a scanning mechanism, e.g. a rotating polygon with differently inclined pairs of polygonal surfaces, by means of which the field of the object is scanned line by line. The electrical signals emitted by the detector, which are proportional in intensity to the infrared radiation detected, are used to control a visible light source. The visible light radiation emitted by this source, which correspond at all times in intensity to the intensity of the infrared radiation, enables the building-up of a line-by-line visible image on a focussing screen using a second scanning mechanism which operates in synchronism with the first-mentioned scanning mechanism. However, the signals can also be fed to a control system or to a servo computer.

As already mentioned, in order to be sensitive to the infrared radiation, the detector must be strongly cooled. In addition, its recording angle must be precisely defined and must be matched to the scanning mechanism arranged in front of it, i.e. a diaphragm must be placed in front of the detector in order precisely to define its aperture. At the same time, however, it is necessary to ensure that the detector does not, for example, pick up any radiation from any parts of the equipment because this would then act as interfering radiation.

The two latter conditions are fulfilled in a known manner by the prior art by arranging the detector astride the optical axis of a spherical autocollimating mirror which is mirrored on the side facing the detector and which possesses a diaphragm in the area of the optical axis, such diaphragm determining the aperture of the detector. As a result, the detector is protected from interfering radiation emanating from the equipment itself, i.e. an image of the detector is formed within itself from a large solid angle in the direction of the lens, i.e. it "sees", as it were, only itself in the autocollimating mirror.

The features of thermal imaging devices as described above represent state-of-the art technology and devices which are constructed in this manner are generally satisfactory in operation.

Difficulties arise when, in order to accelerate the scanning process (and the building-up of the image), a detector is used which, instead of having just one element, is made up of a large number of individual elements arranged one above the other in the direction of scanning or in a planar configuration, thus forming a multi-element detector.

The problem which then arises is that the image of the detector formed within itself is always height-inverted or laterally reversed by the autocollimating mirror. This is of no importance as long as just a single element is used as the detector. In the case of a multi-element detector, however, difficulties arise because an image of the lowermost single element is now formed on the uppermost single element, and an image of the left element is formed on the right element, and vice versa.

If all the individual elements had the same sensitivity, this height-inverted and laterally reversed image could be tolerated. It is, however, unfortunately the case that the individual elements are not uniformly sensitive; instead, their sensitivity varies, even if only slightly. As a result a less sensitive element is imaged on a more sensitive element, or a more sensitive element is imaged on a less sensitive element. This gives rise to interference in the generation of the image and in general reduces the sensitivity of the overall multi-element detector.

It is an object of a broad aspect of this invention to provide a thermal imaging device with a multi-element detector in such a manner that each individual element is imaged solely on itself by the autocollimating mirror.

By a broad aspect of this invention, an improved thermal imaging device is provided having an optical recording system and a multi-element detector associated with an internally mirrored autocollimating mirror which possesses, close to the pupil of the optical system, a diaphragm for limiting the recording aperture of the multi-element detector is. In the improved device, the multi-element detector is disposed offset from the optical axis; and a mirror is disposed symmetrically offset from the other side of the optical axis at which the autocollimating mirror forms the image of the multi-element detector. The mirror thus projects the image of the multi-element detector back to the autocollimating mirror, from where it is reflected once more right way up and laterally unreversed onto the multi-element detector in such a way that each individual detector element receives its own image.

The mirror preferably is a field lens mirror. It is also preferred that the multi-element detectors be 1-2 mm wide or high.

Figure 2:
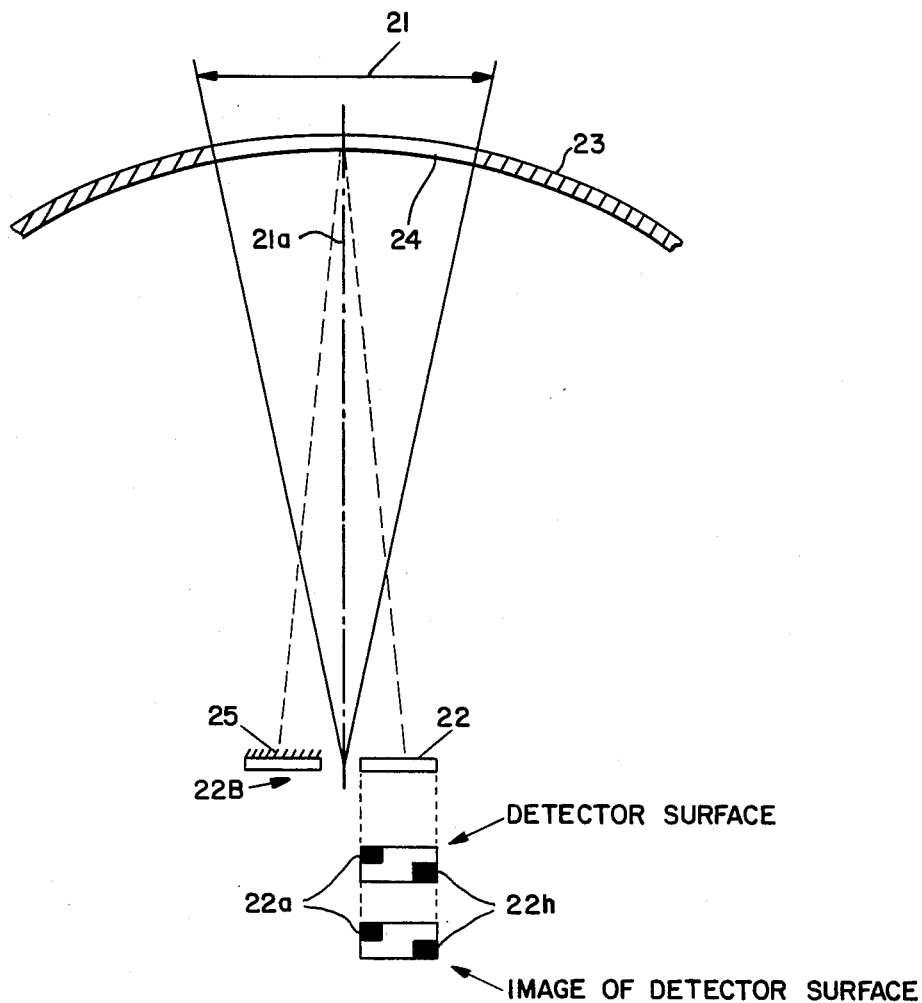

In the accompanying drawings,

FIG. 1 shows, in diagrammatic form, an imaging system usually a multi-element detector arranged according to the prior art; and FIG. 2 shows, in diagrammatical form, an imaging system in a device in which the multi-element detector is arranged according to one embodiment of this invention.

In FIG. 1, the lens is designated by reference number 1. Reference number 2 denotes the multi-element detector in the form of a surface having individual elements 2a–2h, of which, however, only two "end elements" (i.e. 2a and 2h) are shown. Detector 2 is disposed astride the optical axis 1a. Between the detector 2 and the lens 1, an internally mirrored autocollimating mirror 3 is arranged, the mirror possessing an opening 4 in front of the lens. This opening defines the aperture of the detector 2. Opening 4 is situated in a known manner in or close to the pupil of the lens 1.

The autocollimating mirror 3 is shown here as a two-dimensional area which is arranged perpendicular to the plane of the drawing. Such a mirror produces only a laterally reversed image. This presentation has been selected merely for reasons of clarity. However, as a person skilled in this technology is aware, the mirrors actually used in the thermal imaging devices are of the spherical type, i.e. they constitute the inner surface of a sphere which produces, not only a laterally reversed, but also a height-inverted image.

Below detector 2 the surface of the multi-element detector is shown in diagrammatical form. This presentation is obtained if one imagines that the superjacent detector 2 has been folded forward by 90° into the plane of the drawing. It is apparent from this depiction that the multi-element detector consists of the elements 2a–2d in one row and the elements 2e–2h in the other row. For reasons of clarity only the two end elements 2a and 2h are denoted by reference numbers.

The upper surface in the drawing depicts the actual detector 2, while the underlying surface depicts the image of this detector after being reflected by the autocollimating mirror 3. In this drawing the height inversion and lateral reversal of the detector image achieved by the reflection at the autocollimation mirror 3 are each particularly clearly depicted. On the actual detector, i.e. on the detector surface, the element 2a is shown at the left/top, while the element 2h is shown at the right/bottom. On the image of the detector surface, the element 2a is shown at the right/bottom, while the element 2h is shown at the left/top. Similarly, the position of each of the other elements in the detector image is also height-inverted and laterally reversed compared with the actual detector.

FIG. 2 shows in diagrammatic form an arrangement according to one embodiment of this invention in which this height inversion and lateral reversal are each eliminated. The reference number 21 denotes the lens, the reference number 22 is the multi-element detector, reference number 23 is the autocollimating mirror and reference number 24 is the aperture-limiting opening.

However, in this embodiment, the detector 22 is not located astride the optical axis 21a but instead is offset to the side of the optical axis 21a. It is apparent here that, when the detector 22 is displaced from the optical axis 21a, the image of the detector reflected by the autocollimating mirror 23 is also shifted to the other side, in a manner completely symmetrical to the optical axis 21a but to the opposite side. In FIG. 2 this image is designated by the number 22.

The underlying idea behind the invention is to place a mirror, e.g. a field lens mirror 25 at the point where the image 22B is formed and to reflect this image back to the autocollimating mirror 23. The latter mirror 23 in turn once more reflects this image back to detector 22. When this renewed reflection takes place at the autocollimating mirror 23 the image is again height-inverted and laterally reversed so that, finally, an image which is the right way up and lateraly unreversed is reflected back to detector 22 and each individual element receives an image of itself.

This is again shown in diagrammatic form in the two surfaces (the detector surface and the image of the detector surface) arranged below the detector 22. After the double reflection, the image of the individual element 22a is located at left/top, i.e. at the same point at which the element 22a is located in the detector itself. The same applies in the case of element 22h and all intervening individual elements. In each case, the image of each individual element is reflected back onto the respective individual element.

In summary, it should be pointed out that the smaller the dimensions of the multi-element detector, the better this solution will work and the smaller the role played by any imaging errors. In the case of multi-element detectors which are only one or two millimeters wide or high (and whose individual elements accordingly have dimensions in the hundredths of a millimeter range) the lateral offset of the detector from the optical axis also only needs to amount to one or two millimeters so that—as stated—imaging errors do not play a role.

In addition to the fact that imaging errors do not play a role, it is also possible to ignore the fact that, when the detector is laterally offset from the optical axis, the detector is also located slightly to the side of opening 24 and consequently the detector "looks" through this opening at a somewhat oblique angle.

I claim:

1. A thermal imaging device having an optical recording system and a multi-element detector associated with a first mirror comprising an internally-mirrored autocollimating mirror which possesses, close to the pupil of the optical system, a diaphragm for limiting the recording aperture of the multi-element detector, wherein the multi-element detector is disposed offset from the optical axis, and a second mirror is disposed symmetrically at the other side of the optical axis at which the autocollimating mirror forms the image of the multi-element detector; wherein said second mirror comprises means for projecting the image of the multi-element detector back to the autocollimating mirror, from where it is reflected once more right way up and laterally unreversed onto the multi-element detector in such a way that each individual detector element receives its own image.

2. The thermal imaging device of claim 1 wherein said second mirror is a field lens mirror.

3. The thermal imaging device of claim 1 wherein said multiple-element detectors are 1–2 mm wide or high.

* * * * *